US009251350B2

(12) United States Patent
Khilnani et al.

(10) Patent No.: US 9,251,350 B2
(45) Date of Patent: *Feb. 2, 2016

(54) TRUSTED OPERATING ENVIRONMENT FOR MALWARE DETECTION

(75) Inventors: Reshma P Khilnani, Palo Alto, CA (US); Kristofer N. Iverson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.
This patent is subject to a terminal disclaimer.

(21) Appl. No.: 13/102,324

(22) Filed: May 6, 2011

(65) Prior Publication Data
US 2011/0214186 A1     Sep. 1, 2011

Related U.S. Application Data

(63) Continuation-in-part of application No. 12/964,889, filed on Dec. 10, 2010, now Pat. No. 8,230,511, which is a continuation of application No. 11/747,416, filed on May 11, 2007, now Pat. No. 7,853,999.

(51) Int. Cl.
*H04L 29/06*      (2006.01)
*G06F 21/57*      (2013.01)
(Continued)

(52) U.S. Cl.
CPC .............. *G06F 21/575* (2013.01); *G06F 21/00* (2013.01); *G06F 21/567* (2013.01)

(58) Field of Classification Search
CPC . H04L 63/14; H04L 63/1408; H04L 63/1416; H04L 63/20; G06F 21/126; G06F 21/10; G06F 21/50; G06F 21/554; G06F 21/56; G06F 21/561; G06F 21/57; G06F 21/575; G06F 21/577; G06F 21/567
USPC ............... 380/270, 272; 726/22, 24; 455/517, 455/556.1
See application file for complete search history.

(56) References Cited

U.S. PATENT DOCUMENTS 6,269,456 B1      7/2001  Hodges et al.
6,757,824 B1 *   6/2004  England .................. 713/156

(Continued)

FOREIGN PATENT DOCUMENTS

CN          1655088         8/2005
JP          07295804        11/1995

(Continued)

OTHER PUBLICATIONS

Bottino, L.J.; "Security Measures in a Secure Computer Communications Architecture";25th Digital Avionics Systems Conference, 2006 IEEE/AIAA; Year: 2006 pp. 1-18, DOI: 10.1109/DASC.2006.313729.*

(Continued)

*Primary Examiner* — Hadi Armouche
*Assistant Examiner* — Angela Holmes
(74) *Attorney, Agent, or Firm* — Timothy Churna; Sade Fashokun; Micky Minhas

(57) ABSTRACT

Described herein are techniques and apparatuses for scanning a computing device for malware and/or viruses. In various embodiments, a trusted operating environment, which may include a trusted operating system and/or a trusted antivirus tool, may be utilized with respect to a computing device. More particularly, the trusted operating system may be used to boot the computing device. Moreover, the trusted antivirus tool may search the computing device for malware definition updates (e.g., virus signature updates) and use the trusted operating system to scan the computing device for malware. In other embodiments, the trusted antivirus tool may scan the computing device and remove any viruses detected by the trusted antivirus tool. The trusted operating system may then reboot the computing device into a clean environment once any detected viruses are removed.

20 Claims, 6 Drawing Sheets

(51) Int. Cl.
    *G06F 21/00* (2013.01)
    *G06F 21/56* (2013.01)

(56) References Cited

U.S. PATENT DOCUMENTS

| | | | |
|---|---|---|---|
| 6,973,577 | B1 | 12/2005 | Kouznetsov |
| 7,043,757 | B2 | 5/2006 | Hoefelmeyer et al. |
| 7,184,554 | B2* | 2/2007 | Freese .......................... 380/270 |
| 7,188,369 | B2 | 3/2007 | Ho et al. |
| 7,243,373 | B2* | 7/2007 | Muttik et al. .................. 726/24 |
| 7,853,999 | B2 | 12/2010 | Khilnani et al. |
| 8,812,558 | B1* | 8/2014 | Qian .............................. 707/803 |
| 2004/0254978 | A1 | 12/2004 | Ibanez et al. |
| 2005/0015599 | A1* | 1/2005 | Wang et al. ................... 713/176 |
| 2005/0015606 | A1 | 1/2005 | Blamires et al. |
| 2005/0091558 | A1 | 4/2005 | Chess et al. |
| 2005/0176415 | A1 | 8/2005 | Jang et al. |
| 2005/0193188 | A1 | 9/2005 | Huang |
| 2005/0268079 | A1 | 12/2005 | Rothman et al. |
| 2005/0283603 | A1 | 12/2005 | Raman et al. |
| 2006/0031673 | A1 | 2/2006 | Beck et al. |
| 2006/0130141 | A1 | 6/2006 | Kramer et al. |
| 2006/0253908 | A1 | 11/2006 | Yang |
| 2006/0284632 | A1 | 12/2006 | Braverman et al. |
| 2007/0094654 | A1 | 4/2007 | Costea |
| 2007/0289015 | A1* | 12/2007 | Repasi et al. .................. 726/22 |
| 2008/0016313 | A1 | 1/2008 | Murotake et al. |
| 2008/0052507 | A1 | 2/2008 | Chow et al. |
| 2009/0217258 | A1 | 8/2009 | Wenzinger et al. |
| 2009/0319782 | A1 | 12/2009 | Lee |
| 2010/0122343 | A1 | 5/2010 | Ghosh et al. |
| 2010/0332593 | A1 | 12/2010 | Barash et al. |

FOREIGN PATENT DOCUMENTS

| | | |
|---|---|---|
| JP | 10049365 | 2/1998 |
| JP | 11085503 | 3/1999 |
| JP | 2000089992 | 3/2000 |
| JP | 2002132454 | 5/2002 |
| JP | 2006134307 | 5/2006 |
| JP | 2006251945 | 9/2006 |
| JP | 2007026293 | 2/2007 |
| JP | 2008519369 | 6/2008 |
| JP | 2009211524 | 9/2009 |
| JP | 2010097550 | 4/2010 |
| KR | 1020070016029 | 2/2007 |
| WO | WO2004054185 A1 | 6/2004 |
| WO | WO2006049475 | 5/2006 |
| WO | WO2007013176 | 2/2007 |

OTHER PUBLICATIONS

Stephens, B.;"Security architecture for system wide information management";Digital Avionics Systems Conference, 2005. DASC 2005. The 24*th*;Year: 2005, vol. 2 p. 10 pp. vol. 2, DOI: 10.1109/DASC.2005.1563474.*

Chinese Office Action mailed Aug. 25, 2011 for Chinese patent application No. 200880015243.5, a counterpart foreign application of U.S. Appl. No. 11/747,345, 11 pages.

Chinese Office Action mailed Sep. 23, 2011 for Chinese patent application No. 200880015323.0, a counterpart foreign application of U.S. Pat. No. 7,853,999, 16 pages.

Office Action for U.S. Appl. No. 12/964,889, mailed on Nov. 15, 2011, Reshma P. Khilnani, "Trusted Operating Environment for Malware Detection", 10 pgs.

Chinese Office Action mailed Nov. 16, 2012 for Chinese Patent application No. 200880015243.5, a counterpart foreign application of U.S. Pat. No. 8,104,088, 13 pages.

Japanese Office Action mailed Dec. 28, 2012 for Japanese patent application No. 2010-507568, a counterpart foreign application of U.S. Pat. No. 8,104,088, 11 pages.

Koike, et al., "Development of an USB Flash Memory for Detecting Unknown Computer Viruses", IPSJ Journal, vol. 48, No. 4, Information Processing Society of Japan, Japan, Apr. 15, 2007, 2 pages.

Matsuoka, "Multifunctional rescue CD creating with PE Builder+UBCD4Win", PC Japan, vol. 10, No. 12, Softbank Creative Corp., Dec. 1, 2005, 4 pages.

"Renkon", Linux magazine, vol. 7, No. 3, ASCII Corporation, Japan, Mar. 1, 2005, 4 pages.

TTS, "Power Up Security", PC Japan, vol. 11, No. 4, Softbank Creative Corp., Apr. 1, 2006, 5 pages.

Dai, et al., "MAPMon: A Host-Based Malware Detection Tool", IEEE International Symposium on 13th Pacific Rim Dependable Computing, Dec. 17, 2007, pp. 349-356.

Ilascu, "The Insides of Panda Cloud Antivirius", May 16, 2009, interview retrieved Jan. 3, 2011 from <<http://news.softpedia.com/news/The-insides-of-Panda-Cloud-Antivirus-111793.shtml>>, 4 pages.

Marx, "Rescue Me 2: Disinfection with Bootable Rescue Media", at <<avtest.org/down/papers/2004-03_vb_rescue2.pdf>>, Virus Bulletin, Mar. 2004, pp. 14-16.

Wang, et al., "Fast User-Mode Rootkit Scanner for the Enterprise", Proceedings of the 19th Large Installation System Administration Conference (LISA'05), Dec. 2005, pp. 23-30.

Chinese Office Action mailed Apr. 20, 2011 for Chinese patent application No. 200880015323.0, a counterpart foreign application of U.S. Pat. No. 7,853,999, 16 pages.

Chinese Office Action mailed Dec. 31, 2011 for Chinese patent application No. 200880015323.0, a counterpart foreign application of U.S. Pat. No. 7,853,999, 11 pages.

Extended European Search Report mailed Jan. 11, 2012 for European patent application No. 08747556.2, a counterpart foreign application of U.S. Pat. No. 8,104,088, 7 pages.

Extended European Search Report mailed Jan. 3, 2012 for European patent application No. 08747558.8, 7 pages.

Rutten, "Den Wurm geschossen", CT Magazin fur Competertechnik, vol. 2006, No. 21, Oct. 2, 2006, pp. 168-172 (10 pages with English Translation).

Chinese Office Action mailed Apr. 20, 2012 for Chinese patent application No. 200880015243.5, a counterpart foreign application of U.S. Pat. No. 8,104,088, 13 pages.

Russian Office Action mailed Apr. 17, 2012 for Russian patent application No. 2009141594, a counterpart foreign application of U.S. Pat. No. 8,104,088, 5 pages.

Chinese Office Action mailed May 25, 2012 for Chinese patent application No. 200880015323.0, a counterpart foreign application of U.S. Pat. No. 7,853,999, 6 pages.

Chinese Office Action mailed Aug. 3, 2012 for Chinese patent application No. 200880015243.5, a counterpart foreign application of U.S. Pat. No. 8,104,088, 14 pages.

The European Office Action mailed Jun. 12, 2013 for European Patent Application No. 08747556.2, a counterpart foreign application of U.S. Pat. No. 8,104,088, 4 pages.

Japanese Office Action mailed Jul. 1, 2013 for Japanese Patent Application No. 2010-507569, a counterpart foreign application of U.S. Pat. No. 7,853,999, 10 pages.

EP Office Action mailed Dec. 6, 2013 for European Patent application No. 08747556.2, a counterpart foreign application of U.S. Pat. No. 8,104,088, 5 pages.

Japanese Office Action mailed Oct. 15, 2013 for Japanese patent application No. 2010-507569, a counterpart foreign application of U.S. Pat. No. 7,853,999, 6 pages.

Japanese Office Action mailed Apr. 21, 2014 for Japanese patent application No. 2010-507569, a counterpart foreign application of U.S. Pat. No. 7,853,999, 8 pages.

Japanese Office Action mailed Jun. 26, 2015 for Japanese patent application No. 2010-507569, a counterpart foreign application of U.S. Pat. No. 7,853,999, 48 pages.

* cited by examiner

TRUSTED OPERATING ENVIRONMENT FOR MALWARE DETECTION

CROSS-REFERENCE TO RELATED APPLICATIONS

This patent application is a continuation-in-part application of, and claims priority to, co-pending, commonly-owned U.S. patent application Ser. No. 12/964,889, entitled "TRUSTED OPERATING SYSTEM FOR MALWARE DETECTION", and filed on Dec. 10, 2010, which is a continuation of, and claims priority to, U.S. patent application Ser. No. 11/747,416, entitled "TRUSTED OPERATING ENVIRONMENT FOR MALWARE DETECTION" to Khilnani, et al., which issued as U.S. Pat. No. 7,853,999 on Dec. 14, 2010, which each application is incorporated herein in its entirety by reference.

BACKGROUND

Computer security is a serious concern in today's technology-driven culture. A breach of a computer's security can occur when the computer is infected with viruses and other forms of malicious software (malware). Such infections can occur, for example, when files (e.g., email) infected with malware are downloaded and opened, or infections may occur when malware accesses a computer over a network without any direct user intervention. In any case, the prevalence of these security threats has resulted in a wide variety of security-related tools that are available for computers. Examples of these tools include antivirus programs, adware scanners, firewalls, and the like. Despite the availability of these tools, computers continue to be infected with malware.

One reason for the persistence of malware infection is the ability of some malware to hide from security tools. Malware can hide from many security tools through the use of a rootkit, which generally stated, is a set of software tools intended to conceal running processes, files or system data from a computer's operating system. Rootkits can hook themselves very low in a computer's system (e.g., at the kernel level) and intercept the principal system services that the computer's operating system and other applications utilize while running on the computer. In one example, an antivirus tool that resides on a computer scans the computer's hard disk for viruses. As part of the scan process, the computer's operating system makes one or more function calls, such as an "open file" call for a certain file. However, malware that is resident on the computer may use a rootkit to intercept the "open file" function call and return a "file missing" error or return the wrong file. Thus, the antivirus tool is unable to access the requested file and check it for virus infection. If the requested file is infected with a virus, the infection will persist undetected.

SUMMARY

Systems and/or techniques for scanning a computing device for malware and/or viruses are described herein. In various embodiments, a trusted operating environment, which may include a trusted operating system and/or a trusted antivirus tool, may be used to boot and/or scan the computing device. More particularly, the computing device may be booted by the trusted operating system and the trusted antivirus tool may perform a scan of the computing device. Any viruses and/or malware detected by the trusted antivirus tool may then be removed. Furthermore, once any viruses and/or malware identified by the trusted antivirus tool are removed, the trusted operating system may reboot the computing device. Additionally, the trusted operating system and/or the trusted antivirus tool may be running on a server farm that includes one or more servers located remotely from the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The devices and techniques described herein provide a trusted operating environment through which a computing device may be scanned for viruses and other forms of malicious software (malware), and disinfected of any such entities. The terms "virus" and "malware" are used interchangeably herein, and both refer generally to collections of computer code that are designed to infiltrate and/or damage a computer system without the owner's informed consent. Other examples of malware include trojan horses, worms, spyware and the like. The trusted operating environment is created by a trusted authority, such as a software or hardware manufacturer, and is then embodied on a device, such as a server device, or a computer-readable medium that can be interfaced with a computing device. Unauthorized access to the trusted operating environment is prevented through the use of read-only media, authentication protocols, and microcontrollers that permit only trusted data to have access to the trusted operating environment. As used herein, the term authentication refers to any suitable method or protocol that may be implemented to verify the identity of an entity from which a communication or data file originates and to ensure that the communication or data file has not been tampered with or impermissibly altered by an unauthorized entity.

In one example, the trusted operating environment includes a trusted operating system and a trusted antivirus tool. A computing device can be booted using the trusted operating system and thus circumvent the problem of rootkits and other malware that may be hiding on the computing device. The trusted antivirus tool can then scan the computing device and be assured that its interaction with the trusted operating system will accurately reflect the state of the computing device.

Exemplary Architecture

Figure 1:
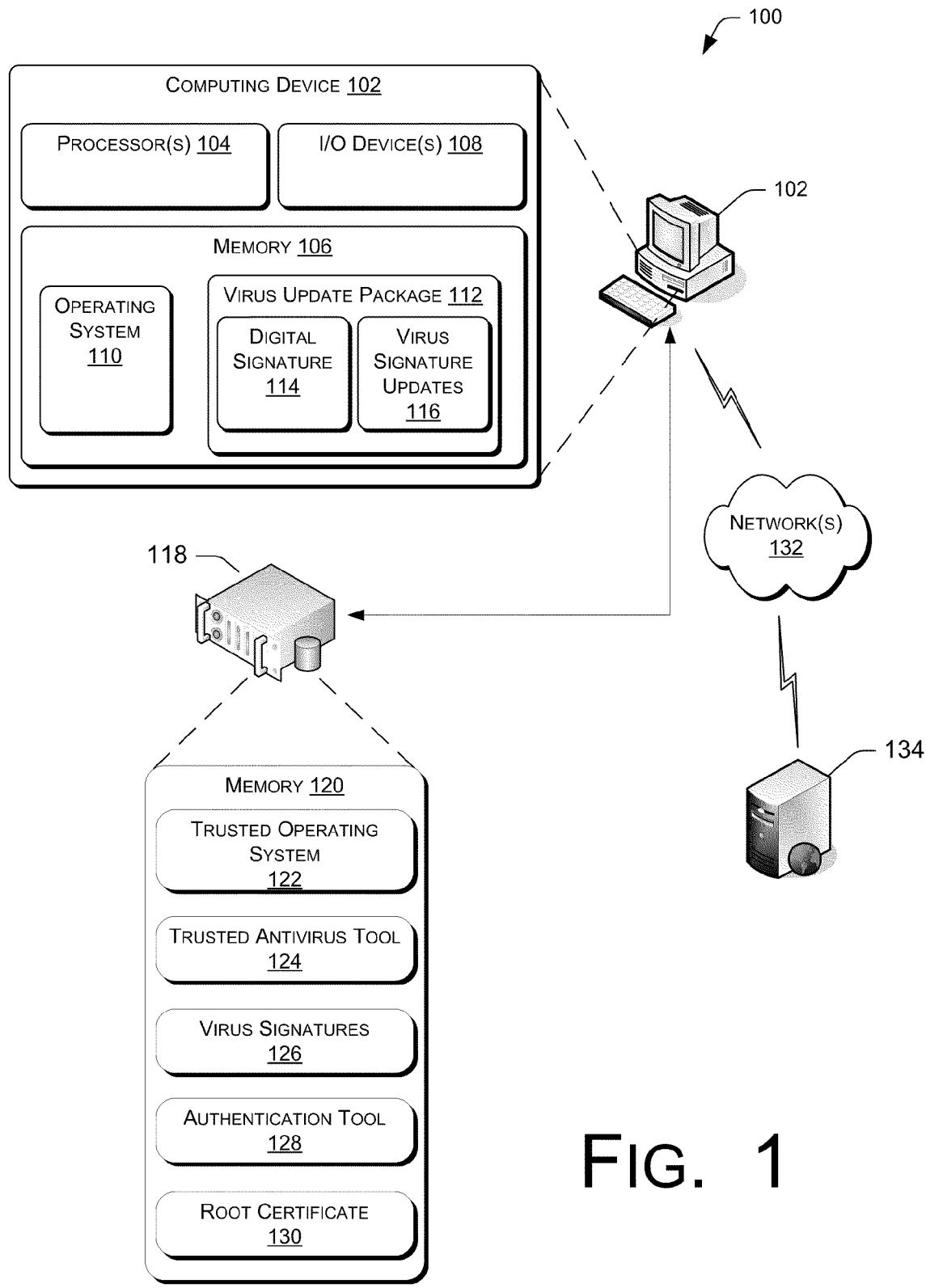
FIG. 1 illustrates an exemplary architecture and a server device for implementing techniques to scan a computing device for malware.

FIG. 1 shows an architecture 100 that can implement the described processes and techniques. As part of architecture 100 is computing device 102. Although illustrated as a desktop PC, computing device 102 may be implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth.

Computing device 102 can include, but is not limited to, one or more processors 104, a memory 106, Input/Output (I/O) devices 108 (e.g., keyboard and mouse), and a system bus (not illustrated) that operatively couples various components including processor(s) 104 to the memory 106. The memory of computing device 102 includes computer-readable media in the form of volatile memory, such as Random Access Memory (RAM) and/or non-volatile memory, such as Read Only Memory (ROM) or flash RAM. Memory 106 typically includes data and/or program modules, such as operating system 110 and virus update package 112. As part of virus update package 112 are digital signature 114 and virus signature updates 116, which will be discussed in more detail below.

To implement a virus scanning process, the computing device 102 may first be communicatively coupled to a server device 118 such that the computing device can access the server device 118. In various embodiments, server device 118 may be physically connected to computing device 102 or server device 118 may be located remotely from computing device 102. Furthermore, server device 118 may be interchangeably referred to as a server and may include a plurality of servers, such as, for example, a server farm.

In various embodiments, computing device 102 may be booted by server device 118. For instance, server device 118 may boot computing device 102 using an automated process, such as by initiating the booting process utilizing an automated agent. Server device 118 includes a memory 120, which stores data and/or program modules and components for implementing the described processes. The terms "module" or "component" as used herein generally represent software, firmware, or a combination of software and firmware. As part of the boot process, computing device 102 loads the trusted operating system (OS) 122 from the memory 120 of server device 118. Trusted antivirus tool 124 is then launched from memory 120, either automatically or by express action by the user. In various embodiments, trusted antivirus tool 124 may be embedded in a physical server appliance, such as, for example, server device 118.

Trusted antivirus tool 124 then loads virus signatures 126 that are stored on memory 120. Virus signatures 126 are a set of virus "fingerprints" that are used to identify viruses. An exemplary virus signature is a binary pattern of all or part of a virus's computer code. Trusted antivirus tool 124 also searches computing device 102 and identifies any virus signatures that are not currently stored on memory 120 of server device 118. In one example, trusted antivirus tool 124 locates virus update package 112, which contains virus signature updates 116, on memory 106. Virus signature updates 116 include one or more virus signatures, some of which may be different (e.g., they may identify more recently catalogued viruses) than any stored on server device 118. Before utilizing virus signature updates 116 in a virus scan, trusted antivirus tool 124 verifies the authenticity of virus update package 112 using authentication tool 128.

To verify and/or authenticate virus update package 112, authentication tool 128 utilizes root certificate 130 from memory 120 to authenticate digital signature 114. Generally stated, digital signature 114 is a coded message or other piece of data that is compared with root certificate 130 to determine if virus update package 112 originates from a trusted authority and has not been tampered with. In one example, digital signature 114 is part of a digital certificate, such as an X.509 certificate, that is part of virus update package 112. If digital signature 114 is determined to be authentic, trusted antivirus tool 124 designates the virus signature updates as authenticated and loads the virus signature updates. This authentication method is presented for purposes of example only, and any suitable cryptographic, verification and/or authentication protocol may be utilized to verify that the virus signature updates have originated from a trusted authority.

Trusted antivirus tool 124 then runs on computing device 102 and scans computing device 102 for viruses using virus signatures 126 and any authenticated virus signature updates from virus update package 112. By interacting with trusted operating system 122 in the virus scan, a user can be assured that operating system calls made during the virus scan process will correctly return the requested files and give an accurate description of computing device 102.

In various embodiments, as stated above, server device 118 may be running trusted operating system 122 trusted antivirus tool 124, and/or authentication tool 128. Moreover, virus signatures 126 and/or root certificate 130 may also be stored in the memory 120 of server device 118. In these embodiments, trusted operating system 122 may be in the form of read-only (i.e, protected) virtualized OS images. Moreover, the read-only virtualized OS images may have access to writable attached storage, such as, for example, virtual hard disks. In some embodiments, the writable attached storage may be associated with the server device 118.

In various embodiments, the virtualized OS images may not be updated during standard execution of software implemented in the memory 120 of server device 118 and, instead, some or all working files may be stored in the attached storage. Additionally, the trusted operating system 122 in the form of the protected virtual images may have the ability to load signed signature data files from the attached storage and/or are able to scan data stored in the attached storage. The trusted operating system 122 may also be able to load signed signature updates to and from the attached storage. That is, the signatures may be included in storage associated with server device 118 (i.e., attached storage) and the attached storage may be utilized to securely distribute the signatures to computing device 102 and/or any other device.

Further to architecture 100, computing device 102 may use network(s) 132 to access remote resource 134. Network(s) 132 may include, but is not limited to, a Local Area Network (LAN), a Wide Area Network (WAN), and a Metropolitan Area Network (MAN). Remote resource 134 may be a web server (i.e., server device 118), a server farm, a mainframe computer, a data center, or any other resource capable of storing and/or transmitting data. Thus, trusted antivirus tool 124 can utilize computing device 102 and network(s) 132 to access remote resource 134 and identify and download one or more virus signature updates that reside on the remote resource, such as server device 118. Any virus signature updates that are identified on remote resource 134 would be authenticated, as discussed above.

Figure 2:
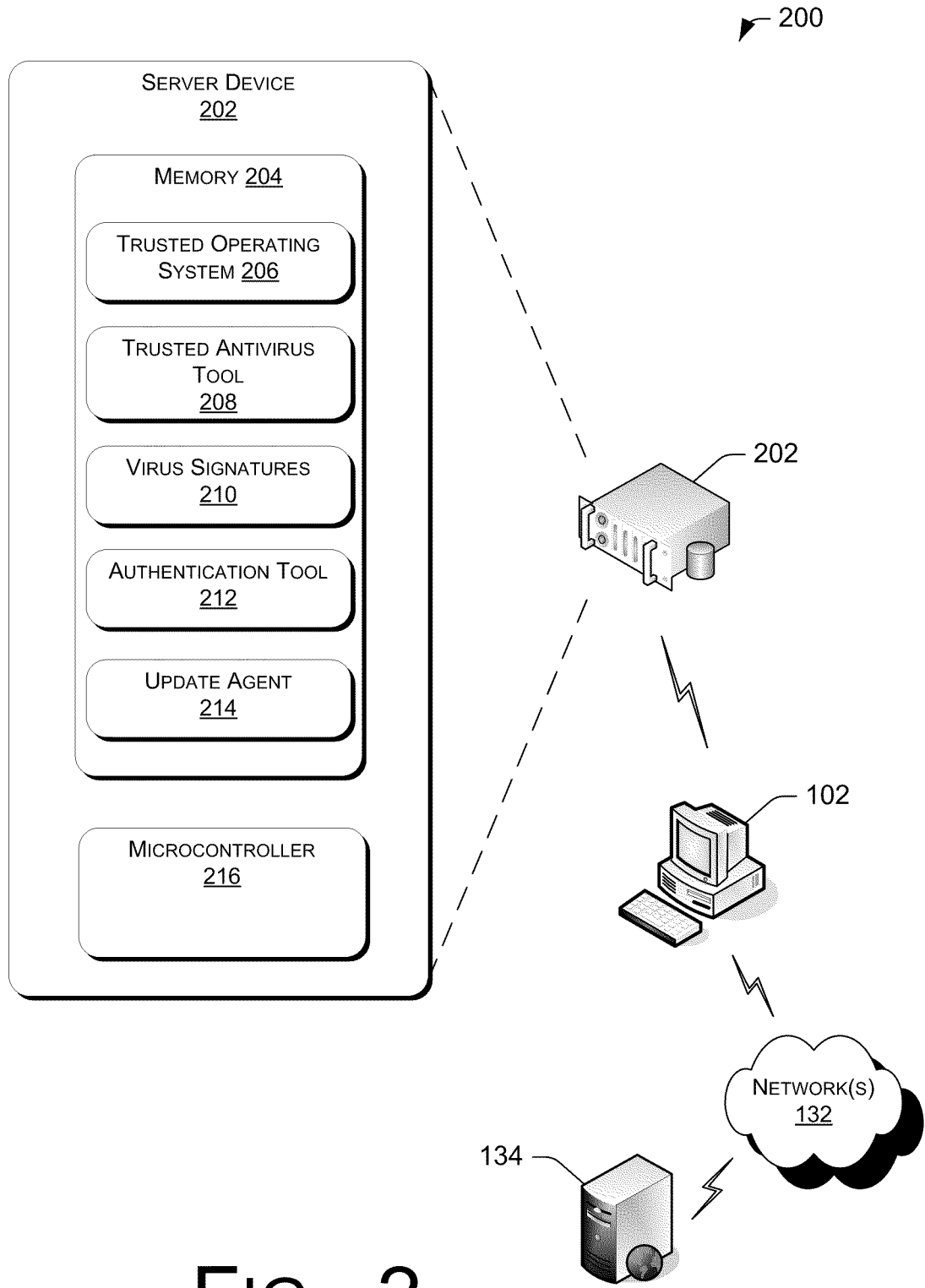
FIG. 2 illustrates an exemplary architecture and server device for implementing techniques to scan a computing device for malware.

FIG. 2 shows an exemplary architecture 200 that can implement the described processes and techniques and variations thereof. Architecture 200 includes computing device 102, introduced in FIG. 1. Also shown is server device 202. Although server device 202 is shown here as a single server, server device 202 may include multiple servers, such as a server farm. In operation, server device 202 is communicatively coupled with computing device 102 and the computing device is booted from the server device 202. As stated above, server device 202 may be located remotely from computing device 102. Moreover, as part of the boot process, computing device 102 accesses memory 204 on server device 202 and loads trusted operating system 206. Memory 204 typically includes data, program modules and components for implementing the described processes that are immediately accessible to and/or presently operated on by microcontroller 216 and/or computing device 102. Additionally, as illustrated with respect to FIG. 1, computing device 102 may use network(s) 132 to access remote resource 134.

Trusted antivirus tool 208 is then launched from memory 204 and the trusted antivirus tool loads virus signatures 210 from memory 204. Trusted antivirus tool 208 can optionally locate and authenticate virus signature updates on computing device 102 using processes similar to those discussed above with respect to FIG. 1. Trusted antivirus tool 208 then proceeds to scan computing device 102 for viruses using the loaded virus signatures. By interacting with trusted operating system 206 that is running on computing device 102, trusted antivirus tool 208 can perform a thorough virus scan of computing device 102, including any storage devices (e.g., hard drives), the basic input/output system (BIOS), hardware, firmware, and the like. If any viruses are located, the viruses are removed from computing device 102. Computing device 102 can then be rebooted into a clean operating environment using its own internal operating system.

Server device 202 has the ability to securely update its own internal components using update agent 214 and microcontroller 216. Microcontroller 216 is an integrated circuit or microprocessor that includes components necessary to control certain procedures and actions of server device 202. Though not illustrated in FIG. 2, components of microcontroller 216 include one or more processors, one or more forms of memory (e.g., read-only memory and/or random access memory), input/output ports, timers, and the like.

Any components of server device 202 may be updated, including virus signatures 210 and trusted antivirus tool 208. As part of the update process, microcontroller 216 can utilize update agent 214 to search computing device 102 for one or more server device component updates. Microcontroller 216 can also utilize update agent 214 to access remote resource 134 via computing device 102 and network(s) 132 to obtain the desired component updates. If any component updates are located, authentication tool 212 can use any suitable authentication and/or cryptographic protocol to verify that the component updates originate from a trusted authority. If a component update is determined to be authentic (i.e., it passes the authentication process) by authentication tool 212, the component update is written to memory 204. Otherwise, microcontroller 216 prevents any unauthenticated and unauthorized data (e.g., component updates that have not passed the authentication process) from being written onto memory 216. Leveraging microcontroller 216 as a "gatekeeper" permits server device 202 to be dynamically updated while maintaining the trusted aspect of its internal components.

Exemplary Processes

Figure 3:
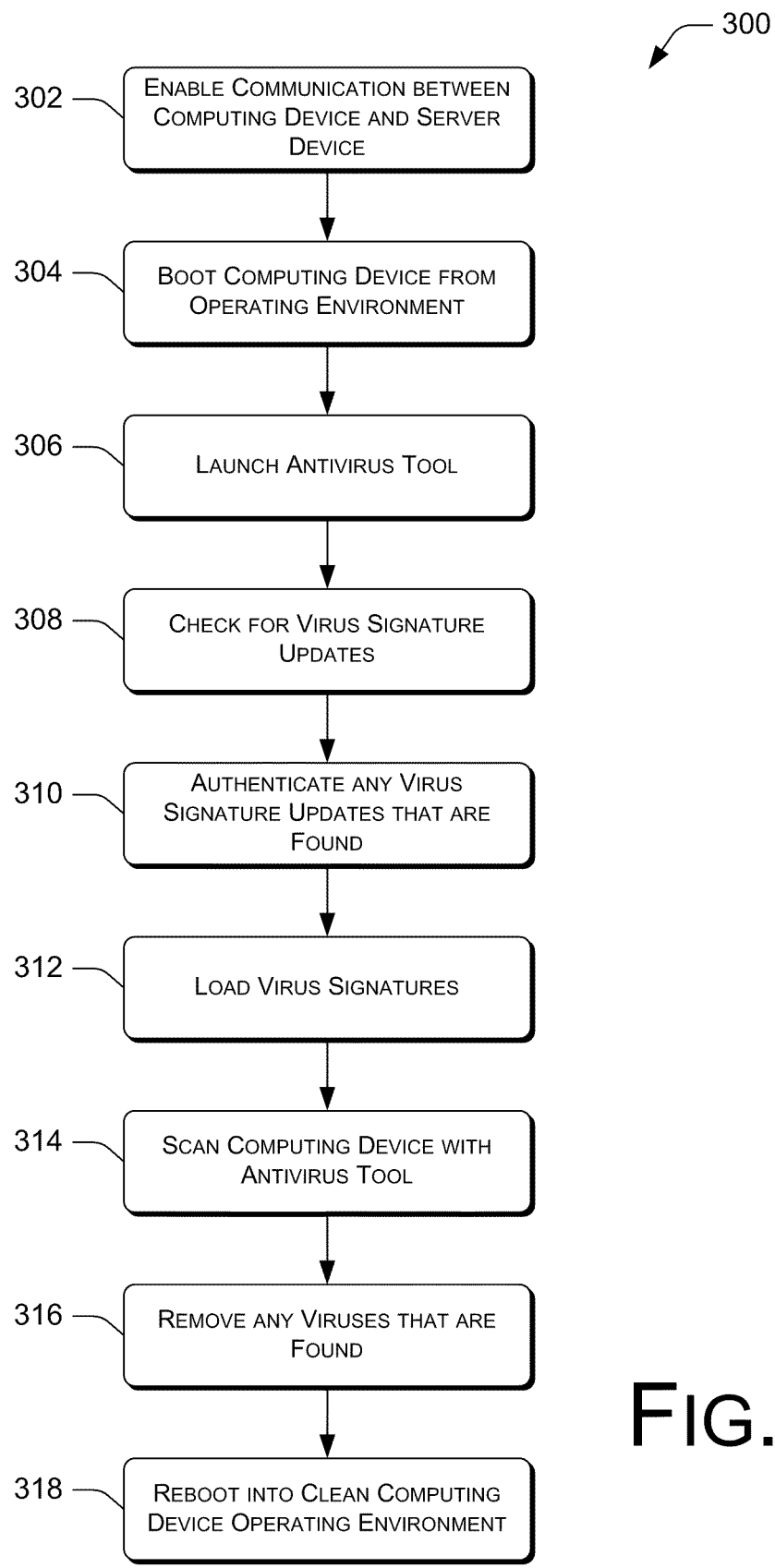
FIG. 3 is a flow diagram of an exemplary process for searching for malware updates and scanning a computing device for malware.

FIG. 3 illustrates an exemplary process 300 for performing a virus scan. The process 300 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. While the processes below are discussed in terms of separate acts, this is not intended to be limiting, and the discussed acts may be combined in some examples. For discussion purposes, the process 300 is described with reference to architecture 100 shown in FIG. 1.

At 302, communication is enabled between a computing device (i.e., computing device 102) and a server device (i.e., server device 118). At 304, the computing device is booted from a trusted operating environment. As part of this boot process, a trusted operating system is loaded from the server device onto the computing device. At 306, a trusted antivirus tool is launched from the server device. Act 306 may be accomplished by running the trusted antivirus tool from the server device, or loading the trusted antivirus tool onto the computing device from the server device and running the tool from the computing device. At 308, the trusted antivirus tool searches the computing device and locates any virus signature updates. The virus signature updates may be part of a virus update package that includes the virus signature updates and a digital signature that can be used to authenticate the updates. The digital signature may be part of an authentication certificate, such as an X.509 certificate, that is stored as part of the virus update package or elsewhere on the computing device. The trusted antivirus tool may also utilize the computing device and a network to search a remote resource for virus signature updates. If any virus signature updates are located and/or identified, the updates are authenticated at 310. In one example, act 310 includes processing the digital signature to determine if the virus signature updates originate from a trusted authority.

At 312, the trusted antivirus tool loads any virus signatures that are stored on the server device, along with any authenticated virus signature updates. At 314, the trusted antivirus tool interacts with the trusted operating system loaded on the computing device to scan the computing device for any viruses that match the loaded virus signatures. The trusted antivirus tool can perform a comprehensive scan of the computing device, including any storage devices (e.g., the hard drive), the BIOS, hardware, firmware, and the like. At 316, any viruses that are located are removed from the computing device. At 318, the computing device is rebooted into a clean internal operating environment. The internal operating environment includes an operating system that has been scanned and cleaned of any viruses or other malware using the techniques discussed herein.

Figure 4:
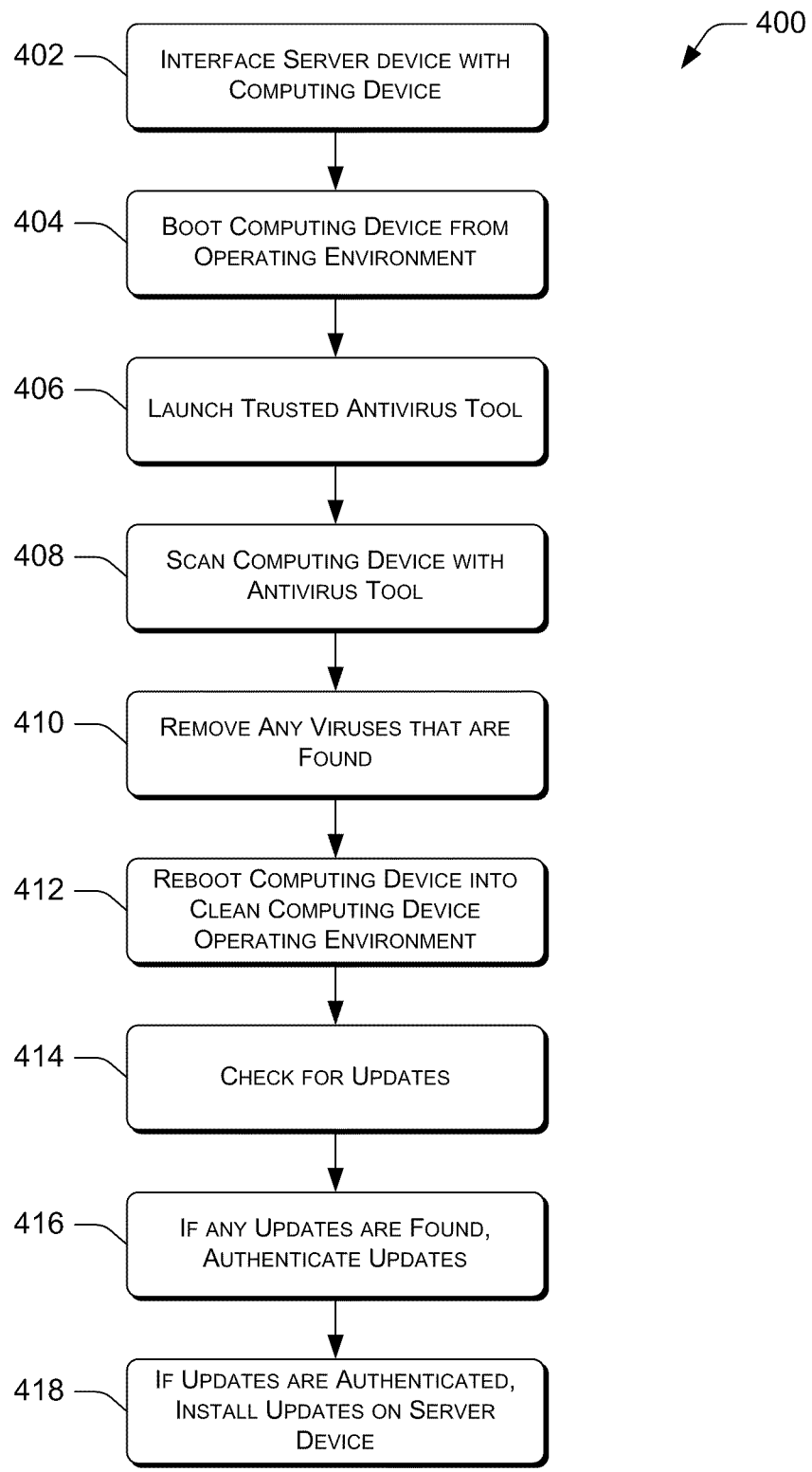
FIG. 4 is a flow diagram of an exemplary process for scanning a computing device for malware and updating components of a server device.

FIG. 4 illustrates an exemplary process 400 for performing a virus scan. The process 400 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 400 is described with reference to architecture 200 shown in FIG. 2.

At 402, a server device (e.g., server device 118 and/or 202) is interfaced with a computing device that is to be scanned for viruses. In one example, act 402 is accomplished by communicatively coupling the server with the computing device utilizing a network. At 404, the computing device is booted from the server device. As part of the boot process, a trusted operating system is loaded from the server device onto the computing device. At 406, a trusted antivirus tool is launched from the server device. Act 406 may be accomplished by running the trusted antivirus tool from the server device, or loading the trusted antivirus tool onto the computing device from the server device and running the tool from computing device. As part of act 406, the trusted antivirus tool loads one or more virus signatures that are stored on the server device. The server device may also locate one or more virus signature updates that are stored on the computing device and/or a remote resource, authenticate the virus signature updates, and load any authenticated virus signature updates. At 408, the trusted antivirus tool interacts with the trusted operating system loaded on the computing device to scan the computing device for any viruses. The antivirus tool identifies any viruses based on the virus signatures stored on the server device, plus any authenticated virus signature updates from the computing device. Any viruses that are located are removed at 410.

At 412, the computing device is rebooted into a clean internal environment that includes an operating system that has been scanned and cleaned of viruses. The internal operating system is an operating system that resides on the computing device (i.e., it is not the operating system that was loaded from the server device). At 414, the server device then checks for updates to its internal components (e.g., virus signatures and the antivirus tool itself). The server device may search the computing device for component updates, or may optionally access a remote resource to search for component updates. If any component updates are located, the component updates are authenticated at 416 using any suitable authentication and/or cryptographic process. If any component updates pass the authentication process, the component updates are installed on the server device at 418. Although not shown here, the process may optionally return to act 404 and rescan the computing device for viruses using any virus signature updates (or other component updates) that were installed on the server device at 418.

Thus, as illustrated, process 400 allows a virus scan to be performed on a computing device using a trusted operating system loaded from a server device. Once the computing device has been scanned and disinfected of any viruses, the server device can then search for any updates to its own internal components, authenticate any updates that are located, and load the authenticated updates. In some implementations, this process is achieved by operating the server device in a read-only mode during most regular file system operations (e.g., during a virus scan), thus preventing viruses and other malware from infecting the server device. During update operations, component update packages are transferred to the server device and authenticated. A microcontroller on the server device controls the authentication process and checks the component update packages for signatures and/or certificates. If the microcontroller determines that the signature and/or certificate for a particular update package is valid, the microcontroller will allow the update package to be written to the server device. Otherwise, the server device will remain in a read-only state to maintain the integrity of its trusted operating environment.

Figure 5:
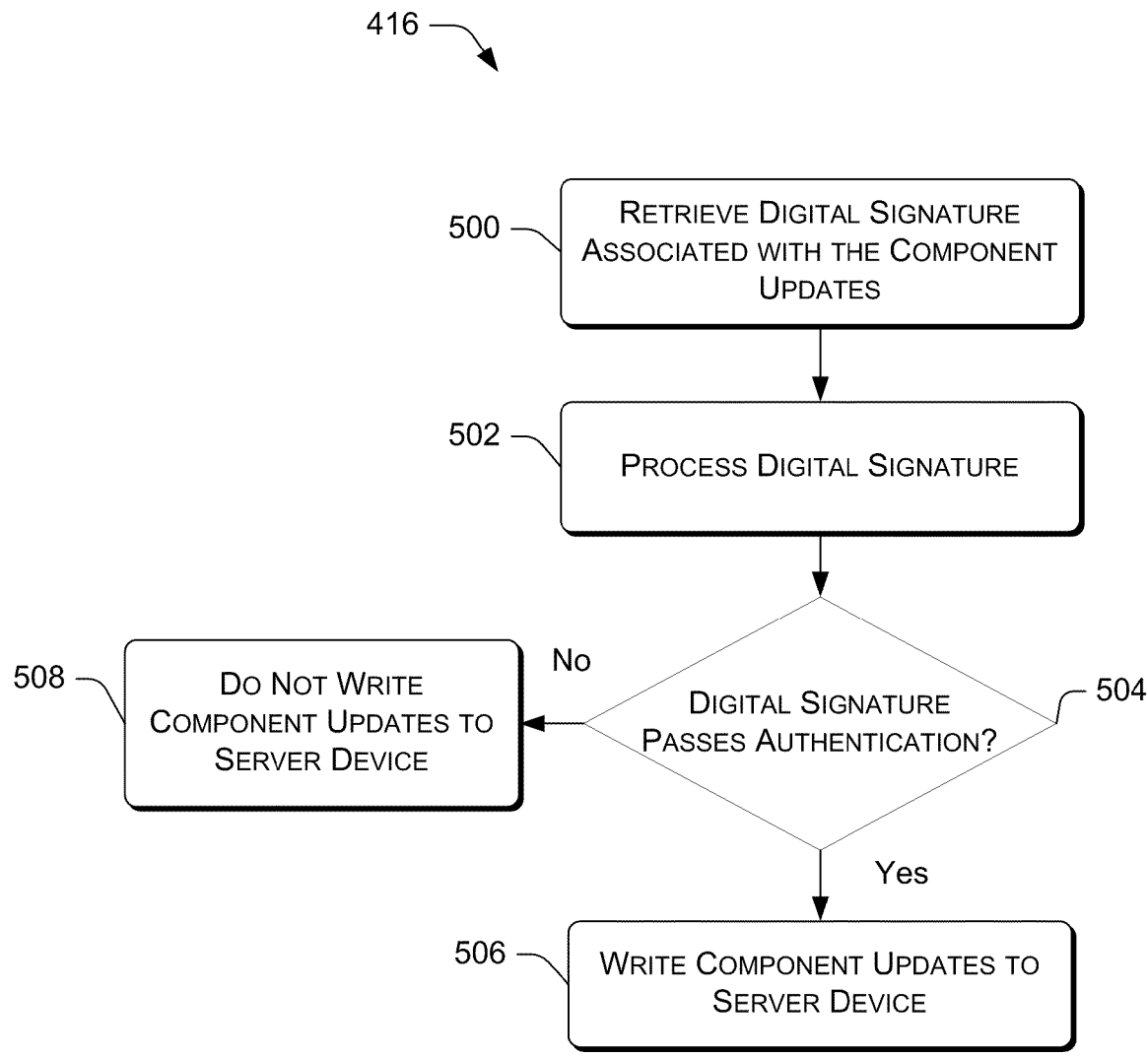
FIG. 5 is a flow diagram of an exemplary process for authenticating server device component updates.

FIG. 5 illustrates one example of a process for authenticating server device component updates, as illustrated above in act 416 of FIG. 4. At 500, a digital signature that is associated with any server device component updates is located and retrieved. As discussed above, this digital signature may be part of an overall authentication certificate. At 502, the digital signature is processed according to any suitable authentication and/or cryptographic protocol. In one example, the digital signature is verified with a root certificate that is stored on the server device. At 504, it is determined if the digital signature has passed the authentication process. If the digital signature is determined to originate from a trusted authority (i.e., is designated as authentic), then the server device component updates associated with the digital signature are written to the server device at 506. If the digital signature fails the authentication process, then at 508, the server device component updates are not written to the server device. In one example, act 508 may include deleting from the computing device any server device component updates that have failed the authentication process.

Secure Storage

Figure 6:
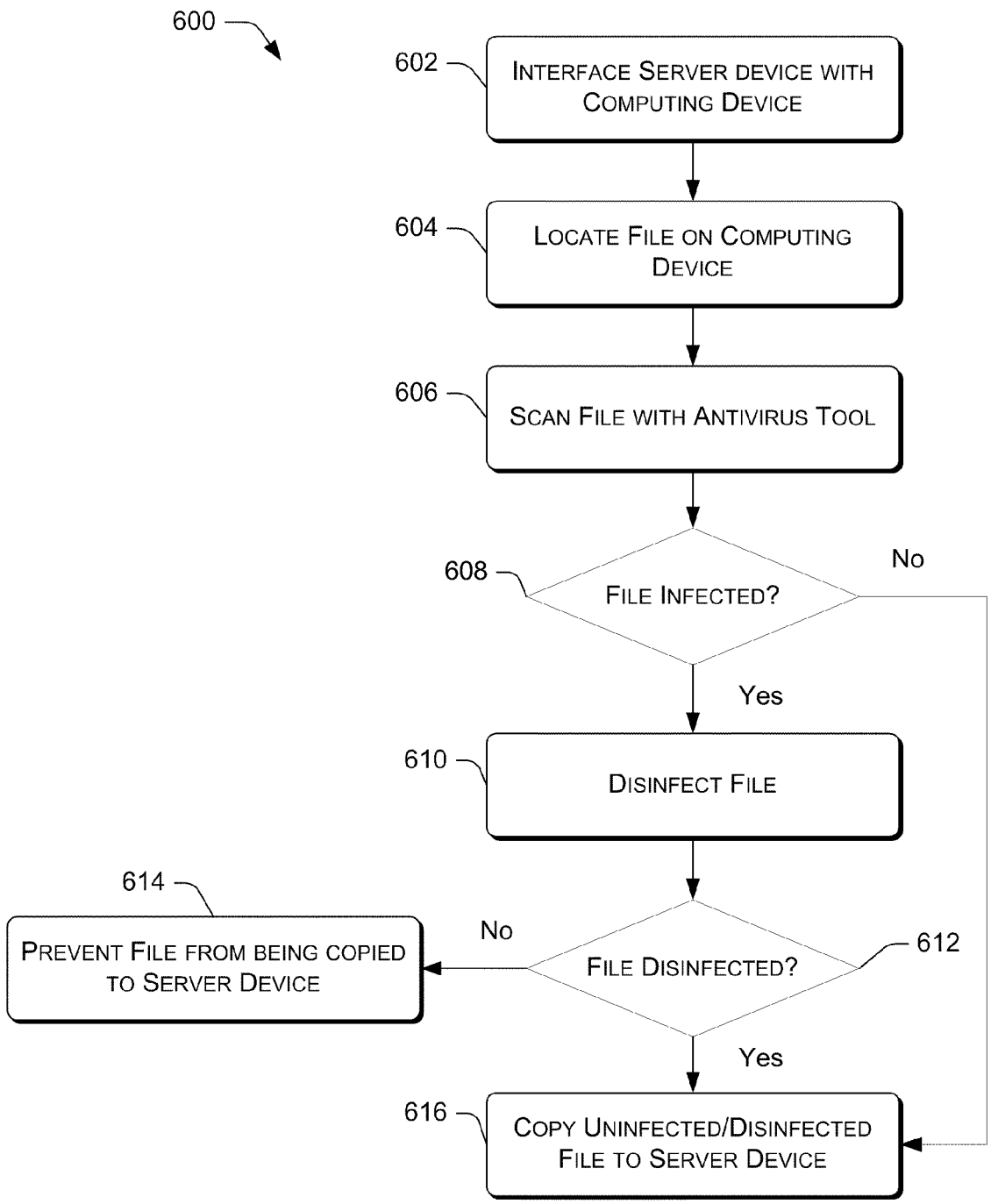
FIG. 6 is a flow diagram of an exemplary process for secure file storage.

FIG. 6 illustrates and exemplary process 600 for implementing a secure storage device. The process 600 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 600 is described with reference to server device 202, as shown in FIG. 2.

At 602, a server device is interfaced with a computing device. In one example, act 602 is accomplished by communicatively coupling the server device to the computing device utilizing a network. At 604, at least one data file that a user wishes to copy and/or transfer to the server device is located on the computing device. In one example, multiple files may be located, and thus the illustrated process would be performed for each file. The data file may be stored locally on the computing device or may be located on a remote resource that is accessible to the computing device. At 606, the data file is scanned for viruses with an antivirus tool that resides on the server device. At 608, it is determined if the data file is infected with a virus or other malware. If any viruses/malware are detected in the data file, the data files are disinfected of the viruses using the antivirus tool at 610 (i.e., the viruses are removed from the files). If no viruses or other malware are detected in the file, the file is copied to the server device at 616. At 612, it is determined if the infected file was successfully disinfected. If the file was not successfully disinfected, at 614 the file is prevented from being copied to the server device. Optionally, the file may be rescanned with the antivirus tool in a further attempt to disinfect the file. If the file was successfully disinfected, then at 616, the disinfected data file is copied to the server device. The server device may then transfer the copied file to other devices without fear of spreading any viruses that may have infected to file. This is particularly useful in public terminal scenarios (e.g., libraries) where many different users have access to a particular device. In such situations, users may unwittingly access and download contaminated files onto the public terminal. Using the secure storage process, a user can ensure that any files downloaded from such a terminal are free from virus contamination.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:
1. A method comprising:
  booting a computing device with a trusted operating system residing on a server device located remotely from the computing device;

running, from the server device, an antivirus tool that resides on the server device;

authenticating one or more virus signature updates by comparing one or more digital signatures associated with the one or more virus signature updates to one or more root certificates;

scanning, with the antivirus tool that resides on the server device, the computing device to identify any viruses residing in the computing device using authenticated virus signature updates; and removing the viruses detected by the antivirus tool based at least in part on the authenticated virus signature updates.

2. A method as recited in claim 1, wherein running the antivirus tool includes loading one or more virus signatures from the server device to the computing device.

3. A method as recited in claim 2, wherein the virus signatures are a set of virus fingerprints used to identify the viruses.

4. A method as recited in claim 1, further comprising:
searching, prior to authenticating the one or more virus signature updates, for the one or more virus signature updates on the computing device; and
utilizing the authenticated virus signature updates to scan the computing device.

5. A method as recited in claim 1, further comprising rebooting the computing device using an operating system that is internal to the computing device.

6. A method as recited in claim 1, wherein:
the trusted operating system is created by a trusted authority; and
booting the computing device removes rootkits or malware stored on the computing device.

7. A method as recited in claim 1, further comprising rebooting the computing device into a clean environment that includes an operating system that has been scanned and cleaned of viruses.

8. A method as recited in claim 1, further comprising:
scanning, using the antivirus tool, a data file that is located remotely from the computing device;
disinfecting the data file using the antivirus tool when one or more viruses are detected in the data file; and
copying the data file to the server device when no viruses are detected in the data file.

9. One or more computer-readable storage devices having computer-executable instructions that, when executed by one or more processors, cause the one or more processors to perform operations comprising:
booting a computing device with a trusted operating system residing on a server device located remotely from the computing device;
running, from the server device, an antivirus tool that resides on the server device; authenticating one or more virus signature updates by comparing one or more digital signatures associated with the one or more virus signature updates to one or more root certificates; scanning, with the antivirus tool that resides on the server device, the computing device to identify any viruses residing in the computing device using authenticated virus signature updates; and
removing the viruses detected by the antivirus tool based at least in part on the authenticated virus signature updates.

10. A device comprising:
a computer-readable memory, the computer-readable memory comprising:
a trusted operating system component configured to utilize a trusted operating system residing on the device to boot a computing device located remotely from the device;
an authentication tool configured to authenticate one or more virus signature updates by comparing one or more digital signatures associated with the one or more virus signature updates to one or more root certificates; and
an antivirus tool component configured to run from the device, to remotely scan and detect viruses on the computing device using authenticated virus signature updates, and to remotely remove the viruses detected on the computing device based at least in part on the authenticated virus signature updates.

11. A device as recited in claim 10, wherein the computer-readable memory further comprises one or more virus signatures configured to be used by the antivirus tool component.

12. A device as recited in claim 10, wherein the trusted operating system is further configured to reboot the computing device into a clean environment subsequent to the antivirus tool component removing any viruses detected on the computing device.

13. A device as recited in claim 10, wherein the antivirus tool component is further configured to search for the one or more virus signature updates on a resource remote to the computing device.

14. A device as recited in claim 10, wherein the one or more virus signature updates are loaded on the device subsequent to authentication.

15. A device as recited in claim 10, further comprising an update agent configured to search for one or more antivirus tool updates on the computing device.

16. A device as recited in claim 15, wherein the authentication tool is further configured to authenticate the one or more antivirus tool updates located by the update agent.

17. A method comprising:
interfacing a server device with a computing device that is located remotely from the server device, the server device including a trusted operating system and an antivirus tool;
booting the computing device with the trusted operating system residing on the server device;
remotely searching, by the server device, for one or more virus signature updates stored on the computing device;
authenticating the one or more virus signature updates by comparing one or more root certificates to digital signatures associated with the one or more virus signature updates;
scanning, with the antivirus tool that resides on the server device and is running from the server device, the computing device to identify any viruses residing in the computing device using authenticated virus signature updates; and
removing the viruses detected by the antivirus tool based at least in part on the authenticated virus signature updates.

18. A method as recited in claim 17, further comprising:
scanning, with the antivirus tool of the server device, one or more data files on the computing device that are to be stored on the server device;
removing any viruses that are detected in the one or more data files; and
writing the one or more data files to storage associated with the server device.

19. A method as recited in claim 17, wherein:
the trusted operating system is in a form of read-only virtual images.

20. One or more computer-readable storage devices having computer-executable instructions that, when executed by one or more processors, cause the one or more processors to perform operations comprising:

interfacing a server device with a computing device that is located remotely from the server device, the server device including a trusted operating system and an antivirus tool;

booting the computing device with the trusted operating system residing on the server device;

remotely searching, by the server device, for one or more virus signature updates stored on the computing device;

authenticating the one or more virus signature updates by comparing one or more root certificates to digital signatures associated with the one or more virus signature updates;

scanning, with the antivirus tool that resides on the server device and is running from the server device, the computing device to identify any viruses residing in the computing device using authenticated virus signature updates; and removing the viruses detected by the antivirus tool based at least in part on the authenticated virus signature updates.

* * * * *